(12) United States Patent
Hara

(10) Patent No.: US 11,829,821 B2
(45) Date of Patent: Nov. 28, 2023

(54) PRINT SYSTEM IN WHICH A PRINT JOB IS GENERATED IN ASSOCIATION WITH AN IDENTIFICATION (ID) OF AT LEAST ONE PRINTING APPARATUS, USER INFORMATION AND A PRINT CODE THAT IS ISSUED BY SERVER SYSTEM FOR PRINTING FILE, INFORMATION PROCESSING APPARATUS, AND PRINTING APPARATUS

(71) Applicant: CANON KABUSHIKI KAISHA, Tokyo (JP)

(72) Inventor: Yosuke Hara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/834,110

(22) Filed: Jun. 7, 2022

(65) Prior Publication Data

US 2023/0004767 A1     Jan. 5, 2023

(30) Foreign Application Priority Data

Jun. 30, 2021   (JP) ................................ 2021-109416

(51) Int. Cl.
| | | |
|---|---|---|
| G06F 3/12 | (2006.01) | |
| G06K 15/02 | (2006.01) | |
| G06F 3/0486 | (2013.01) | |
| H04N 1/44 | (2006.01) | |

(52) U.S. Cl.
CPC ....... *G06K 15/1806* (2013.01); *G06F 3/0486* (2013.01); *G06F 3/1204* (2013.01); *G06F 3/1238* (2013.01); *G06F 3/1258* (2013.01); *H04N 1/4413* (2013.01)

(58) Field of Classification Search
None
See application file for complete search history.

(56) References Cited

U.S. PATENT DOCUMENTS

| 9,521,277 | B1 * | 12/2016 | Johnson | ............. H04N 1/00363 |
| 11,307,821 | B2 * | 4/2022 | Otsuka | .................... G06F 3/126 |
| 2014/0355034 | A1 * | 12/2014 | Mihara | .................. G06F 3/1222 |
| | | | | 358/1.14 |

(Continued)

FOREIGN PATENT DOCUMENTS

JP   4872631 B2   2/2012

*Primary Examiner* — Haris Sabah
(74) *Attorney, Agent, or Firm* — VENABLE LLP

(57) ABSTRACT

A print system includes an information processing apparatus that uploads a file to the server system together with identification information of a printing apparatus to be used for printing the file, and a server system that stores, in a memory, generated print code in association with information of the file and the identification information of the printing apparatus to be used for printing the file, receives the print code and the identification information of the printing apparatus that have been transmitted from the printing apparatus, and searches for the stored file that is associated with the received print code and the identification information and generates the print job based on the searched file. In addition, a printing apparatus transmits, to the server system, the inputted print code and the identification information of the printing apparatus and executes printing of the file based on the received print job.

14 Claims, 11 Drawing Sheets

(56) References Cited

U.S. PATENT DOCUMENTS

| | | | |
|---|---|---|---|
| 2015/0116764 A1* | 4/2015 | Mori | G06F 3/126 |
| | | | 358/1.15 |
| 2016/0041798 A1* | 2/2016 | Maekawa | G06F 3/1287 |
| | | | 358/1.15 |
| 2017/0094119 A1* | 3/2017 | Fukasawa | H04N 1/4413 |
| 2018/0246691 A1* | 8/2018 | Yamada | G06F 3/1203 |
| 2021/0294546 A1* | 9/2021 | Yasuhara | G06F 3/1238 |

* cited by examiner

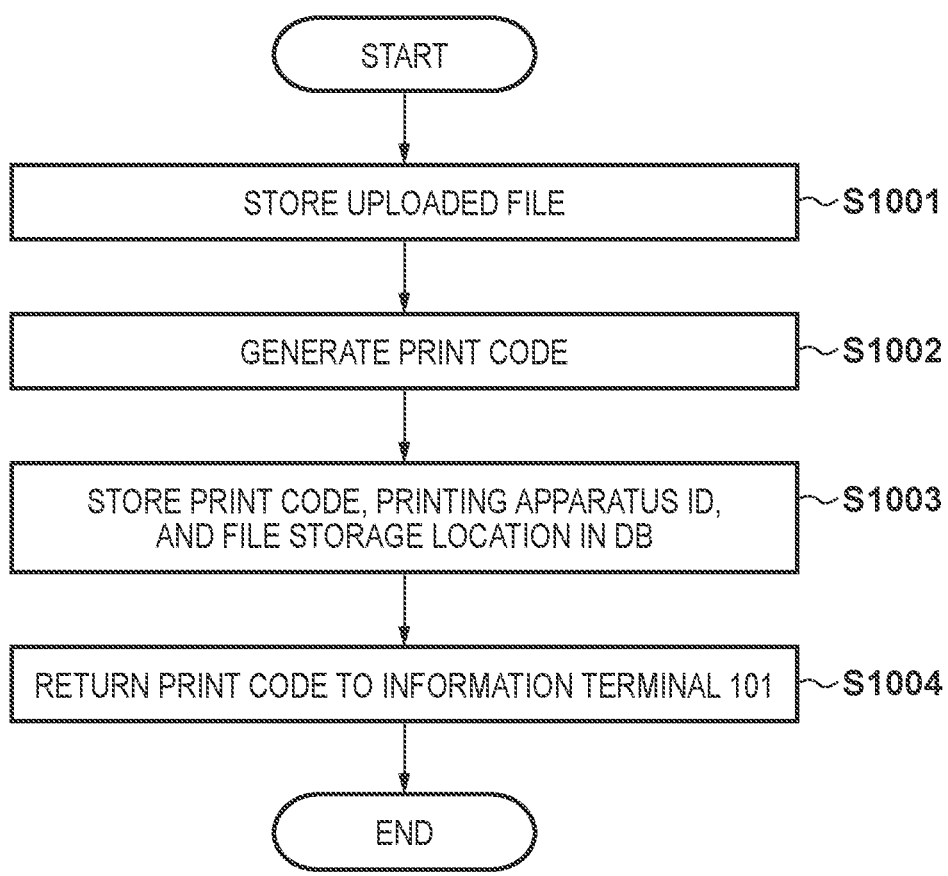

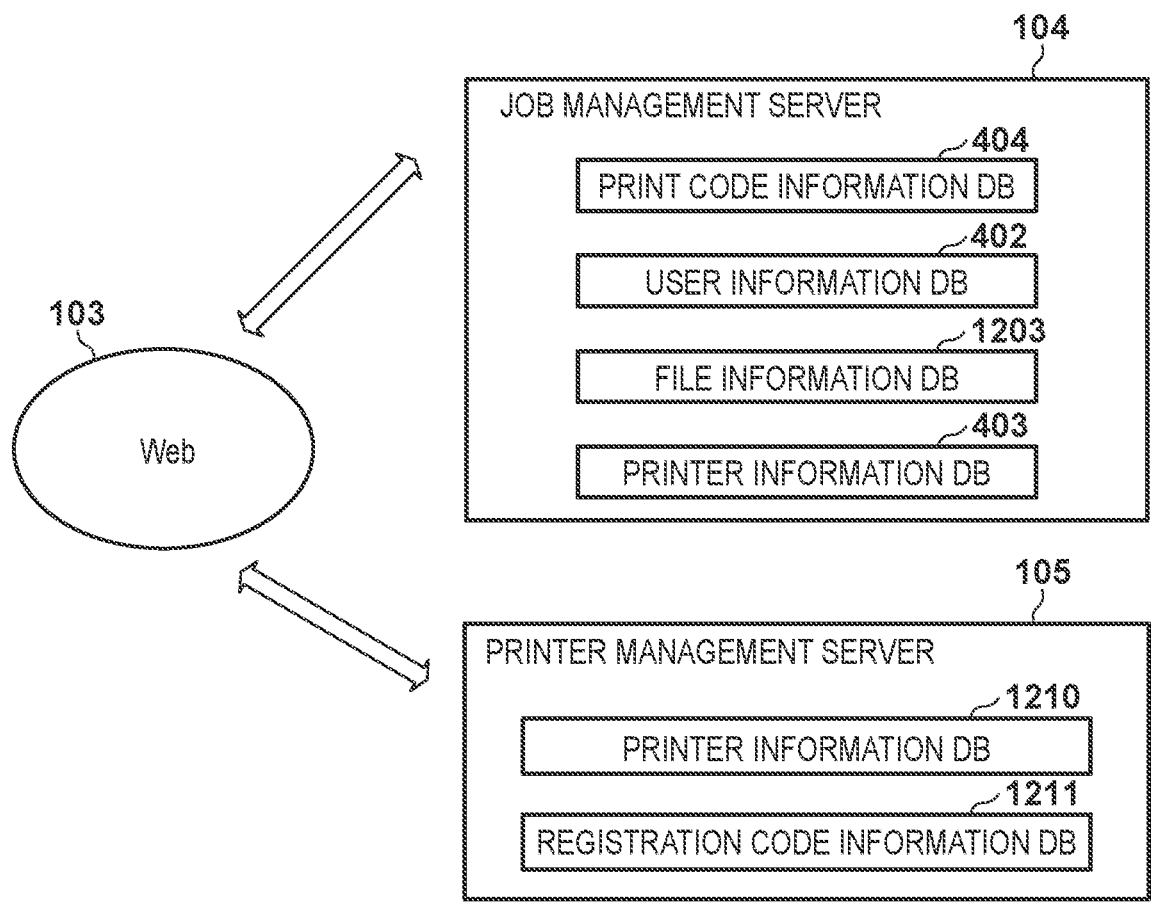

PRINT SYSTEM IN WHICH A PRINT JOB IS GENERATED IN ASSOCIATION WITH AN IDENTIFICATION (ID) OF AT LEAST ONE PRINTING APPARATUS, USER INFORMATION AND A PRINT CODE THAT IS ISSUED BY SERVER SYSTEM FOR PRINTING FILE, INFORMATION PROCESSING APPARATUS, AND PRINTING APPARATUS

BACKGROUND OF THE INVENTION

Field of the Invention

The present invention relates to a print system, a server system, an information processing apparatus, and a printing apparatus.

Description of the Related Art

In recent years, remote work, working from home, and the like in which one connects to an intranet environment of their company from home without going to the company and works by handling materials that are in the company on their PC at home have rapidly spread. As a solutions for implementing such remote work, there is a desktop virtualization technology (VDI (Virtual Desktop Infrastructure) connection), for example. Furthermore, recent improvements in technologies such as network speed and security have enabled one to do their work for their company from home just as well. As the demand for such remote work increases, the demand for printing files that are in the company using a PC and a printer at home also increases. For this demand, there is a print system (a job management service) which can print files via the Internet using a printer at home by connecting a VDI to the company's intranet. By using this service, a user can acquire a printout of a file of the company even if they are at home.

In Japanese Patent No. 4872631, a print job that has been printed out by a client is stored in a print server, and when a user card is held over a card reader of a printer, the user is authenticated by user information stored in the card and the print server storing the print job of the user is specified. Japanese Patent No. 4872631 describes a service in which print jobs of the user are requested from the specified print server and the print server searches for the print jobs, displays a list of the found print jobs, prompts the user to select a desired print job, and then prints it.

There is a business model in which a company that owns printing apparatuses rents out a printing apparatus to a user. By connecting a device for user authentication and then authenticating using a card or inputting a password via the device by employing the technology described in Japanese Patent No. 4872631, printing is executed only for an authenticated user, and thereby, erroneous printing can be prevented. However, if printing apparatuses are managed with such a device for authentication being connected to the printing apparatuses, the burden on a company renting out the printing apparatuses increases.

SUMMARY OF THE INVENTION

An aspect of the present invention is to eliminate the above-mentioned problem with conventional technology.

A feature of the present invention is to provide a technique capable of preventing erroneous printing by a simple configuration.

According to a first aspect of the present invention, there is provided a print system having a printing apparatus and a server system, the server system comprising: one or more first processors and one or more first memories configured to: store, in a storage unit, a file that has been uploaded from an information processing apparatus that is capable of communicating with the server system; generate a print code based on a request for issuing a print job from the information processing apparatus and transmit, to the information processing apparatus, the generated print code; receive the print code that has been transmitted from the printing apparatus and generate a print job based on the file that is associated with the received print code; and make a print instruction based on the generated print job to the printing apparatus, and the printing apparatus comprising: one or more second processors and one or more second memories configured to: display, on a display unit, a screen that accepts input of the print code from a user; transmit, to the server system, the inputted print code; and execute printing based on the print instruction according to the print job.

According to a second aspect of the present invention, there is provided a server system that is capable of communicating with a printing apparatus, the system comprising: one or more processors and one or more memories configured to: store, in a storage unit, a file that has been uploaded from an information processing apparatus being capable of communicating with the server system; generate a print code based on a request for issuing a print job from the information processing apparatus and transmit, to the information processing apparatus, the generated print code; receive the print code that has been transmitted from the printing apparatus and generate a print job based on the file that is associated with the received print code; and make a print instruction based on the generated print job to the printing apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a flowchart for explaining processing for when the job management server according to the embodiment stores an uploaded file and then generates and stores a print code.

FIG. 12A is a functional block diagram for describing functional configurations of the job management server and the printer management server according to the embodiment.

FIG. 12B is a diagram illustrating an example of a print code information DB stored in the job management server according to the embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
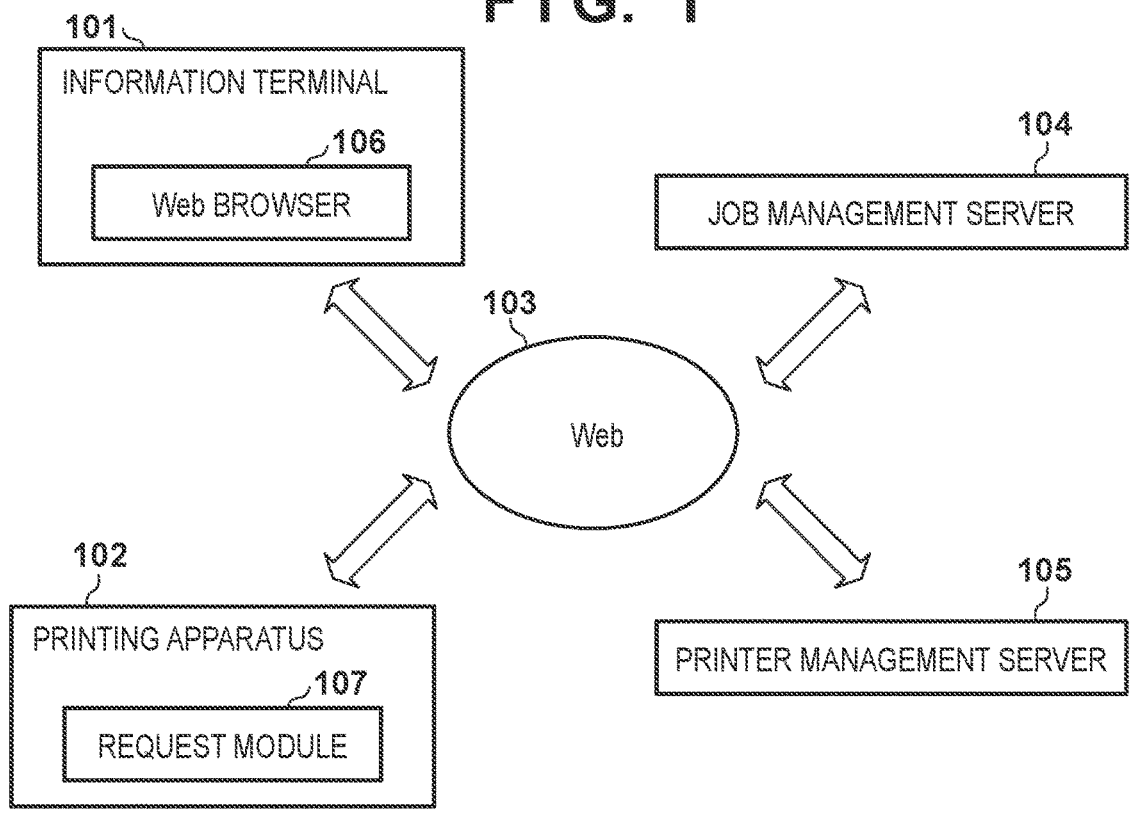
FIG. 1 is a diagram illustrating an example of a configuration of a print system according to an embodiment of the present invention.

FIG. 1 is a diagram illustrating an example of a configuration of a print system according to an embodiment of the present invention.

The print system includes a job management server 104, a printer management server 105, an information terminal (information processing apparatus) 101, and a printing apparatus 102. The information terminal 101 is an information terminal such as a PC or a smartphone owned by a user. A Web browser 106 is installed and available on the information terminal 101. The printing apparatus 102 is a printing apparatus owned by the user. A request module 107 (a web browser) that can make a request via the Internet is installed and is available on the printing apparatus 102. In the embodiment, although the printing apparatus 102 communicates with the job management server 104 by a web application on a browser, communication may be performed via firmware mounted on the printing apparatus 102, and the present invention is not limited to the present embodiment.

The job management server 104 provides a function for storing a file uploaded by a user, issuing a print code, creating a print job with a print code, accepting a print code, creating a print job based on the accepted print code, and the like. Here, the print code is a unique code issued by the job management server 104 by the information terminal 101 requesting the job management server 104 to issue a print job based on a file uploaded by the user. The print code thus issued by the job management server 104 is notified to the information terminal 101, and the print code is used when instructing printing from the printing apparatus 102 as described later.

The job management server 104 that has received the print code generates a print job based on the print code and requests the printer management server 105 to perform printing. By this, the printer management server 105 transmits a print job to the printing apparatus 102 and thereby causes it to execute printing. The printer management server 105 also stores information relating to the printing apparatus 102. Here, the above-described servers, apparatus, and the like are connected via the Web 103, and the Web browser 106 of the information terminal 101 performs the following processing while communicating with the job management server 104.

When the user uploads a file for generating a printout via the Web browser 106 of the information terminal 101 to the job management server 104, the file is stored in the job management server 104. The job management server 104 issues a print command by instructing printing after the user uploads the file and performs print settings. By this, the job management server 104 issues a print code, generates and stores a print job with the print code (hereinafter, referred to as print code information), notifies the information terminal 101 of the print code, and the like.

The request module (Web browser) 107 of the printing apparatus 102 performs the following processing while communicating with the job management server 104. When a print code inputted via the request module 107 of the printing apparatus 102 is received, the job management server 104 searches for a file corresponding to the print code. When the file is found in this manner, a print job is generated based on that file, and the generated print job is transmitted to the printer management server 105 and then printing is requested. This makes it possible for the printer management server 105 to perform printing by receiving a print job and then instructing the printing apparatus 102 to perform printing in accordance with the print job.

In the present example, the job management server 104 and the printer management server 105 are provided as separate servers, but one server apparatus may execute the functions of the job management server 104 and the printer management server 105. The job management server 104 may be configured by a plurality of server devices. That is, the functions of the job management server 104 may be executed by the plurality of server apparatuses operating in cooperation. The printer management server 105 may similarly be configured by a plurality of server apparatuses. In the present disclosure, a configuration configured by one server apparatus or a plurality of server apparatuses is called a server system.

Figure 2:
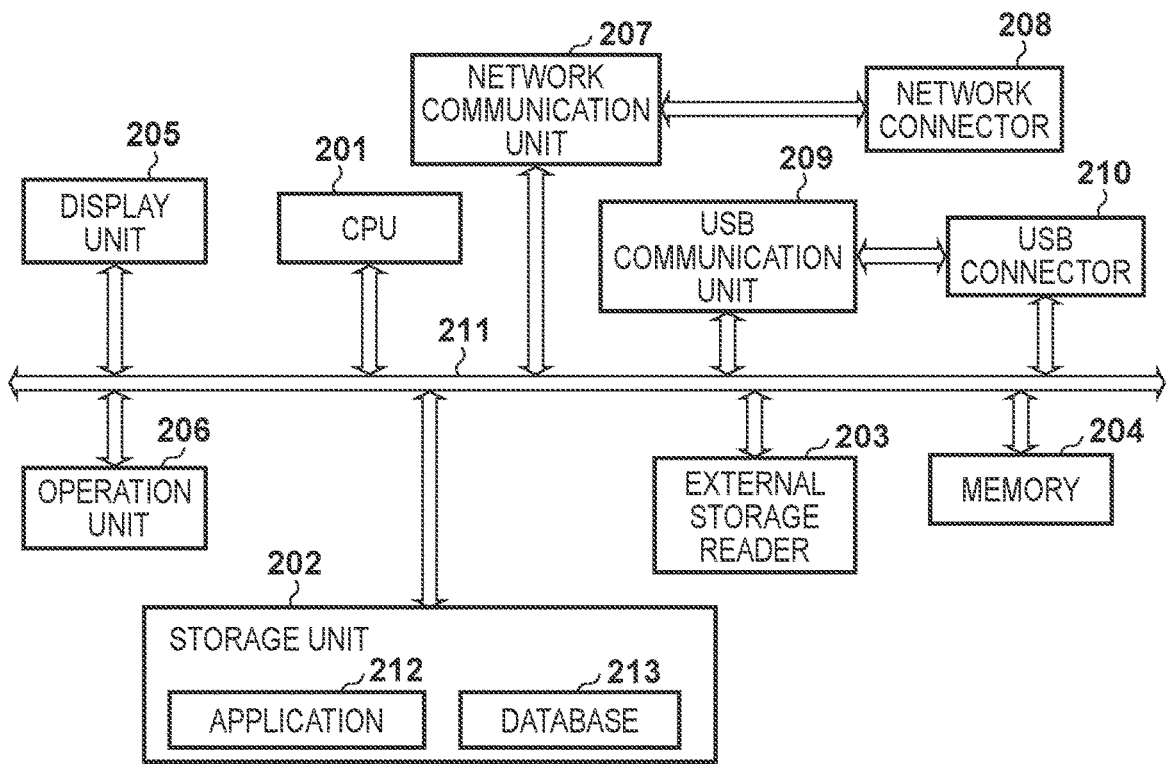
FIG. 2 is a block diagram for explaining a hardware configuration of an information terminal according to the embodiment.

FIG. 2 is a block diagram for explaining a hardware configuration of the information terminal 101 according to the embodiment. Since the hardware configurations of the job management server 104 and the printer management server 105 according to the embodiment are basically the same as that of this hardware configuration, descriptions thereof will be omitted.

A CPU 201 is a central processing unit for controlling the following units. A storage unit 202 stores an application program 212 to be read by the CPU 201, a database 213, and various other files of an OS. An external storage reader 203 reads out information such as a file stored in an external storage medium such as an SD card, for example. The memory 204 is configured by, for example, a RAM or the like, and the CPU 201 performs temporary storing and buffering of data and the like in the memory 204 as necessary. A display unit 205 includes, for example, a liquid crystal display unit and displays various kinds of information. An operation unit 206 includes a keyboard, a pointing device, and the like for the user to perform various input operations. A network communication unit 207 is connected to a network such as the Internet via a network connector 208, and performs various kinds of communication via that network. The network communication unit 207 supports a wired LAN or wireless LAN, and the network connector 208 for when a wired LAN is supported includes a connector for connecting a wired LAN cable. The network connector 208 for when a wireless LAN is supported includes an antenna or the like. The network connector 208 may support both a wired LAN and a wireless LAN. A USB communication unit 209 is connected to various peripheral apparatuses via a USB connector 210 and performs various kinds of communication. The above-described units are connected to each other by a bus 211.

Figure 3:
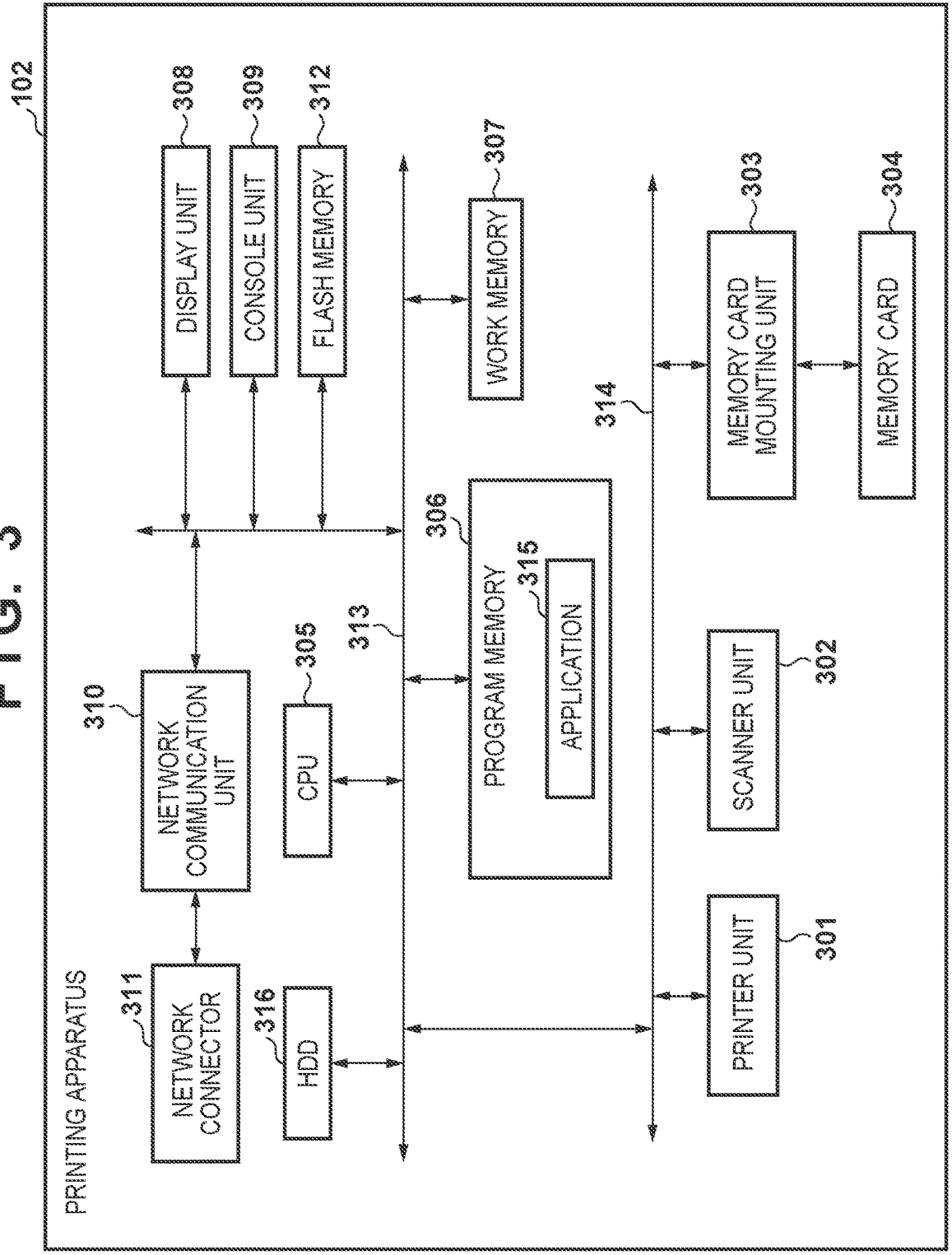
FIG. 3 is a block diagram for explaining a hardware configuration of a printing apparatus according to the embodiment.

FIG. 3 is a block diagram for explaining a hardware configuration of the printing apparatus 102 according to the embodiment. In the embodiment, a printing apparatus of another form may be used so long as the apparatus has a printing function. For example, it may be a multifunction machine, an image processing apparatus, a copy machine, a facsimile, or the like.

In the printing apparatus 102, a printing function is realized by a printer unit 301, a scanning function is realized by a scanner unit 302, and a storage function is realized by a memory card mounting unit 303 and a memory card 304. Each of units described above is connected to each other via a bus 314.

The printer unit 301 prints image data received from an external unit, image data stored in the memory card 304, or the like on a printing medium such as a printing sheet by a printing method such as an inkjet printing method or an electrophotographic method. The printer unit 301 also manages information on consumables which is, for example, ink information including the remaining amount of ink and paper information such as the number of stacked sheets. The printer unit 301 may further have, when it is of the inkjet printing method, a maintenance function such as head cleaning in the inkjet printing method.

The scanner unit 302 optically reads a document set on a document table (not illustrated) and converts it into electronic data. The printing apparatus 102 transmits the image data converted into a designated file format to an external device via a network or stores it in a storage region such as an HDD 316. In a copy service, the scanner unit 302 reads by the scanner unit 302 a document placed on the document table and transfers the generated image data to the printer unit 301, and then the printer unit 301 performs printing on a printing medium such as a printing sheet based on the image data.

Various kinds of file data are stored in the memory card 304 mounted in the memory card mounting unit 303. This file data may be read out to and edited from an external device via a network. In addition, file data may be stored in the memory card 304 from an external device.

Further, the printing apparatus 102 includes a CPU 305, a program memory 306, a work memory 307, a display unit 308, a console unit 309, a network communication unit 310, a network connector 311, and a flash memory 312. The CPU 305 is a central processing unit for collectively controlling each unit of the printing apparatus 102. The program memory 306 includes, for example, a ROM or the like and stores various program codes, an application 315 which is, for example, for communicating with an external server, and the like. The program memory 306 holds identification information (ID) that can identify an individual of the printing apparatus 102. The application 315 can also obtain consumables information such as ink and paper by accessing the printer unit 301. The work memory 307 includes a RAM or the like and is used to temporarily store and buffer image data and the like at the time of execution of each service. The display unit 308 includes, for example, a liquid crystal display unit and displays various kinds of information such as a user interface screen. The console unit 309 also includes a keyboard, a pointing device (touch panel), a switch, and the like and can accept instructions and operations from the user. The network communication unit 310 performs various kinds of communication by connecting the printing apparatus 102 to the network via the network connector 311. The network connector 311 supports a network medium such as a wired LAN or a wireless LAN and, when a wired LAN is supported, includes a connector for connecting, for example, a wired LAN cable. When a wireless LAN is supported, an antenna or the like, for example, is included. The network connector 311 may support both a wired LAN and a wireless LAN. The flash memory 312 is a non-volatile memory for storing the image data or the like received by the network communication unit 310. Each of units described above is connected to each other via a bus 313. There may also be a block for performing data conversion between the bus 314 and the bus 313.

The operation of the printing apparatus 102 according to the embodiment is realized, for example, by the CPU 305 deploying, from the program memory 306 to the work memory 307, a program that is necessary for processing and then executing it.

The configurations illustrated in FIGS. 2 and 3 are examples, and each apparatus may include hardware other than what is illustrated. Also in the drawings of FIGS. 2 and 3, a plurality of blocks may be combined into one block, or one block may be divided into two or more blocks. That is, each apparatus illustrated in FIGS. 2 and 3 may be of another configuration so long as the processing according to the embodiment to be described later can be executed. For example, each apparatus illustrated in FIGS. 2 and 3 may have a plurality of CPUs and a plurality of memories and perform processing in cooperation.

Next, a method by which the job management server 104 manages the user and the printing apparatus 102 will be described.

Figure 4:
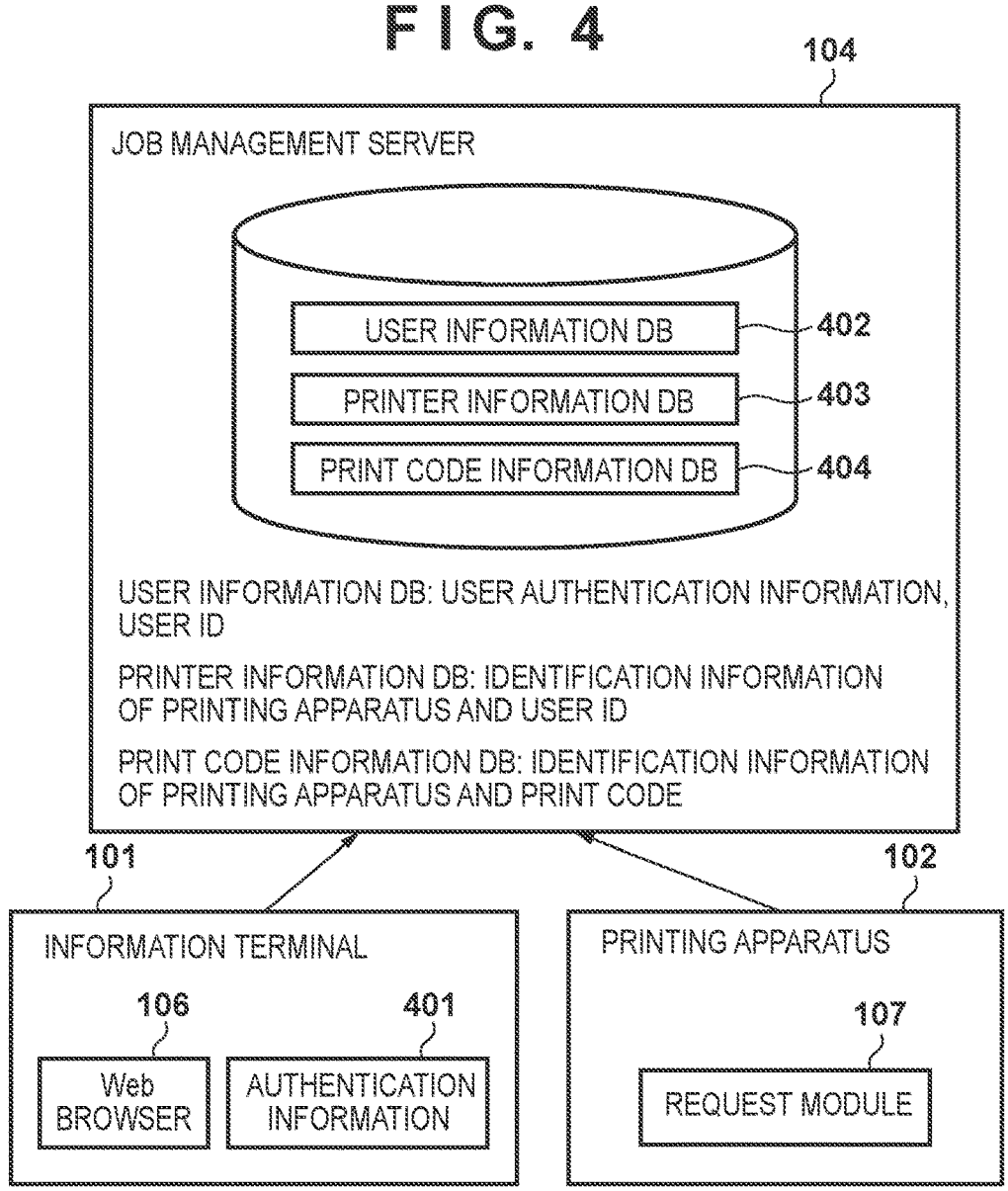
FIG. 4 is a conceptual diagram for explaining the relationship between information on a user and the printing apparatus by a job management server according to the embodiment.

FIG. 4 is a conceptual diagram for explaining the relationship between information on the user and the printing apparatus 102 by the job management server 104 according to the embodiment.

User authentication information 401 inputted from the Web browser 106 of the information terminal 101 is managed by the job management server 104. Specifically, the user authentication information 401 (e.g., the user's email address and the like) is registered for user registration by the user who wants to receive a service. By the user authentication information 401 being registered, the job management server 104 issues a user ID. By this, a user information database (DB) 402 stores the user authentication information 401 and the user ID in association with each other.

Further, a printer information database (DB) 403 stores the identification information (ID) of the printing apparatus and the user ID in association with each other. Further, a print code information database (DB) 404 stores the user ID, the identification information of the printing apparatus, and the print code in association with each other. Printer information is information indicating the association between the printing apparatus and the user and includes the identification information of the printing apparatus and the user ID. When a print code is received via the request module 107 of the printing apparatus 102, the job management server 104 generates a print job corresponding to the print code.

Figure 5:
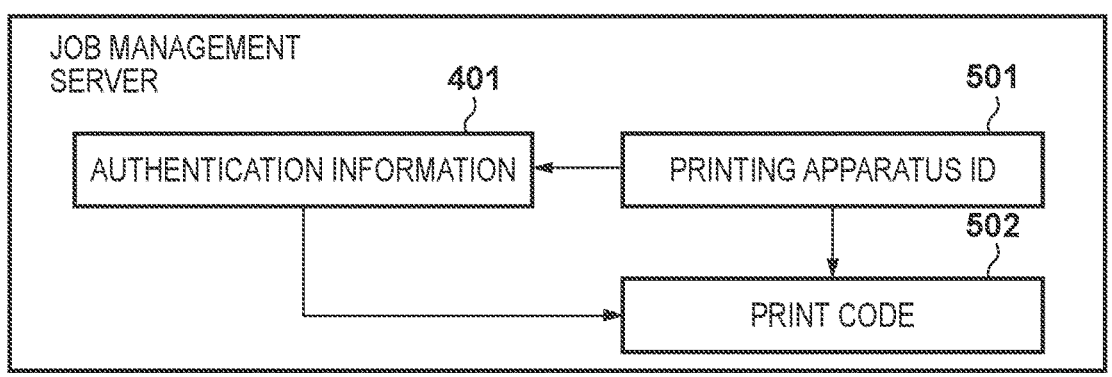
FIG. 5 is a conceptual diagram for explaining a configuration for issuing a print code based on user authentication information and information on the printing apparatus in the job management server according to the embodiment.

FIG. 5 is a conceptual diagram for explaining a configuration for issuing a print code 502 based on user authentication information 401 and information on the printing apparatus 102 in the job management server 104 according to the embodiment.

The job management server 104 manages, for each user, an ID 501 of the printing apparatus 102 owned by the user. When a certain user uploads a file from the information terminal 101 to the job management server 104, the job management server 104 searches for whether or not the ID 501 of the printing apparatus owned by the user is registered in the user information DB 402 based on the user authentication information 401. Then, when it is determined that it is registered, the print code 502 is issued.

Next, registration processing in which the user and the printing apparatus 102 are associated for the user to use the print system according to the embodiment will be described.

Figure 6A:
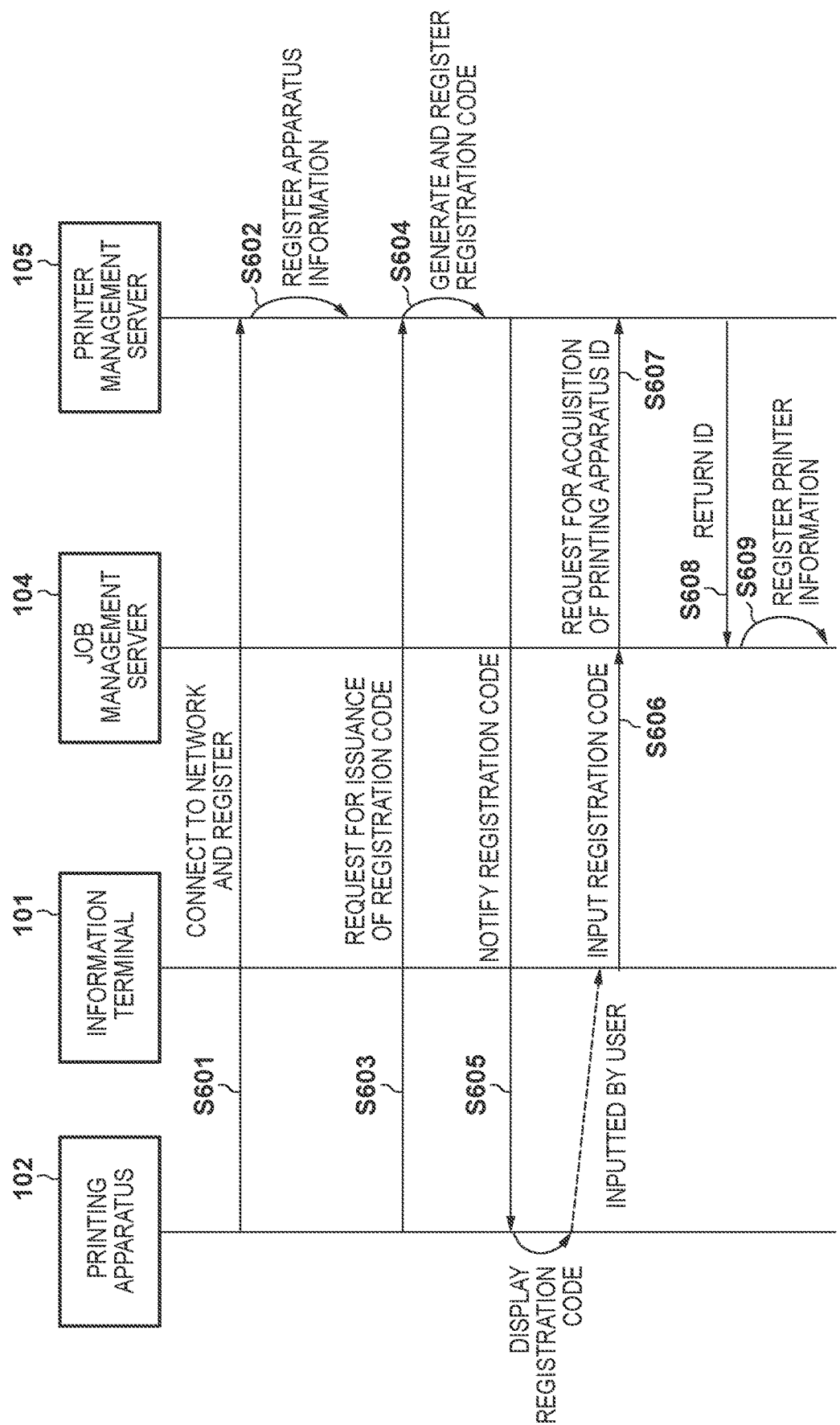
FIG. 6A is a sequence diagram for explaining a flow of processing for registering the printing apparatus executed between the printing apparatus, the information terminal, the job management server, and a printer management server according to the embodiment.

FIG. 6A is a sequence diagram for explaining a flow of processing for registering the printing apparatus executed between the printing apparatus 102, the information terminal 101, the job management server 104, and the printer management server 105 according to the embodiment. It is assumed that, prior to the execution of the sequence of FIG. 6A, the user has performed in advance user registration for receiving this service. That is, since the user authentication information and the user ID indicated in FIG. 4 are registered in the job management server 104 by the user registration, the processing in FIG. 6A is executed in a state in which the user authentication information and the user ID are registered in the job management server 104.

When the printing apparatus 102 is connected to the network in step S601, in step S602, the device information of the printing apparatus 102 is registered in the printer management server 105. The device information includes identification information (ID) of the printing apparatus 102. Next, in step S603, the printing apparatus 102 requests the printer management server 105 to register the printing apparatus 102 and requests a registration code of the printing apparatus 102. By this, in step S604, the printer management server 105 issues the registration code and registers, as registration code information, the identification information and the registration code of the printing apparatus 102 in a set. Then, in step S605, the printer management server 105 notifies the printing apparatus 102 of the generated registration code and causes the printing apparatus 102 to display it.

Next, in step S606, the user of the information terminal 101 inputs, from the information terminal 101, the registration code that is displayed in the printing apparatus 102, and the information terminal 101 notifies the job management server 104 of the registration code. By this, in step S607, the job management server 104 sends the registration code to the printer management server 105 and requests that the identification information (ID) of the printing apparatus corresponding to the registration code be obtained. By this, in step S608, the printer management server 105 obtains the ID of the printing apparatus corresponding to the registration code based on the registration code transmitted from the job management server 104 and returns the ID of the printing apparatus to the job management server 104. By this, in step S609, the job management server 104 associates, based on the returned ID of the printing apparatus, the ID of the printing apparatus with the user ID that has been registered in advance and registers them as the printer information. The ID of the printing apparatus registered in this way corresponds to the ID 501 of the printing apparatus in FIG. 5.

Figure 6B:
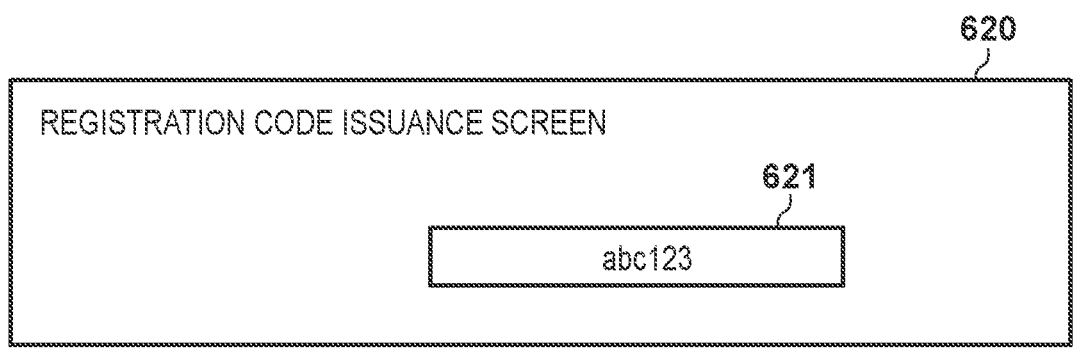
FIG. 6B is a diagram illustrating an example of a registration code issuance screen for displaying a registration code to be displayed on a display unit of the printing apparatus.

FIG. 6B is a diagram illustrating an example of a registration code issuance screen that is to be displayed when displaying the registration code in step S605 of FIG. 6A and is for displaying, on the display unit 308, the registration code that is necessary for associating the printing apparatus 102 and the job management server 104 of the printing apparatus 102.

A registration code issuance screen 620 indicates a framework of a GUI, and a registration code is displayed in an area 621.

Figure 6C:
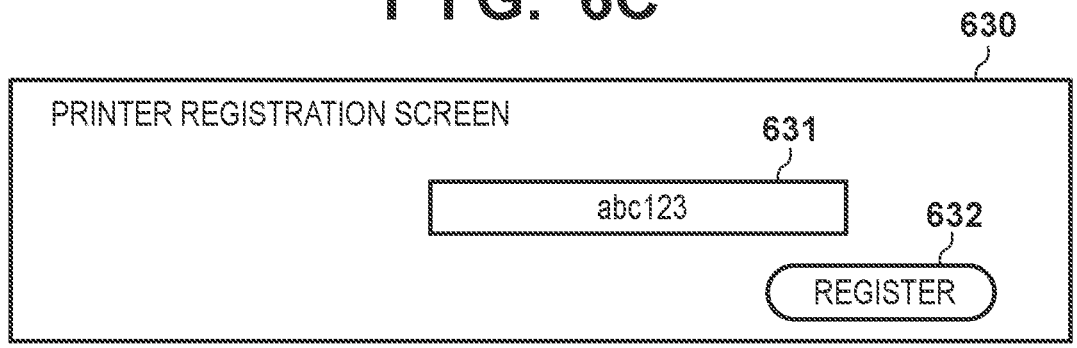
FIG. 6C is a diagram illustrating an example of a printer registration screen for inputting the registration code when inputting the registration code in step S606.

FIG. 6C illustrates an example of a printer registration screen that is to be displayed on the display unit of the information terminal 101 according to the embodiment and is for inputting the registration code in step S606 of FIG. 6A.

A printer registration screen 630 indicates a framework of a GUI, and an area 631 is an area for inputting a registration code issued by the printing apparatus 102. The user inputs the registration code displayed on the display unit of the printing apparatus 102 to this area 631 and presses a registration button 632. By this, the registration code that associates the printing apparatus 102 and the user is registered in the job management server 104. In a screen for executing printing (FIG. 8), which will be described later, when the printing apparatus 102 and the information terminal 101 are not associated in the job management server 104, a file cannot be uploaded and a print job cannot be issued from the information terminal 101.

As described above, the user of the information terminal 101 can register, in the job management server 104, the printer information in which the printing apparatus 102 and the user are associated.

Next, processing, such as issuing a print code or issuing a job, up to when the user issues a command for executing printing will be described.

Figure 7:
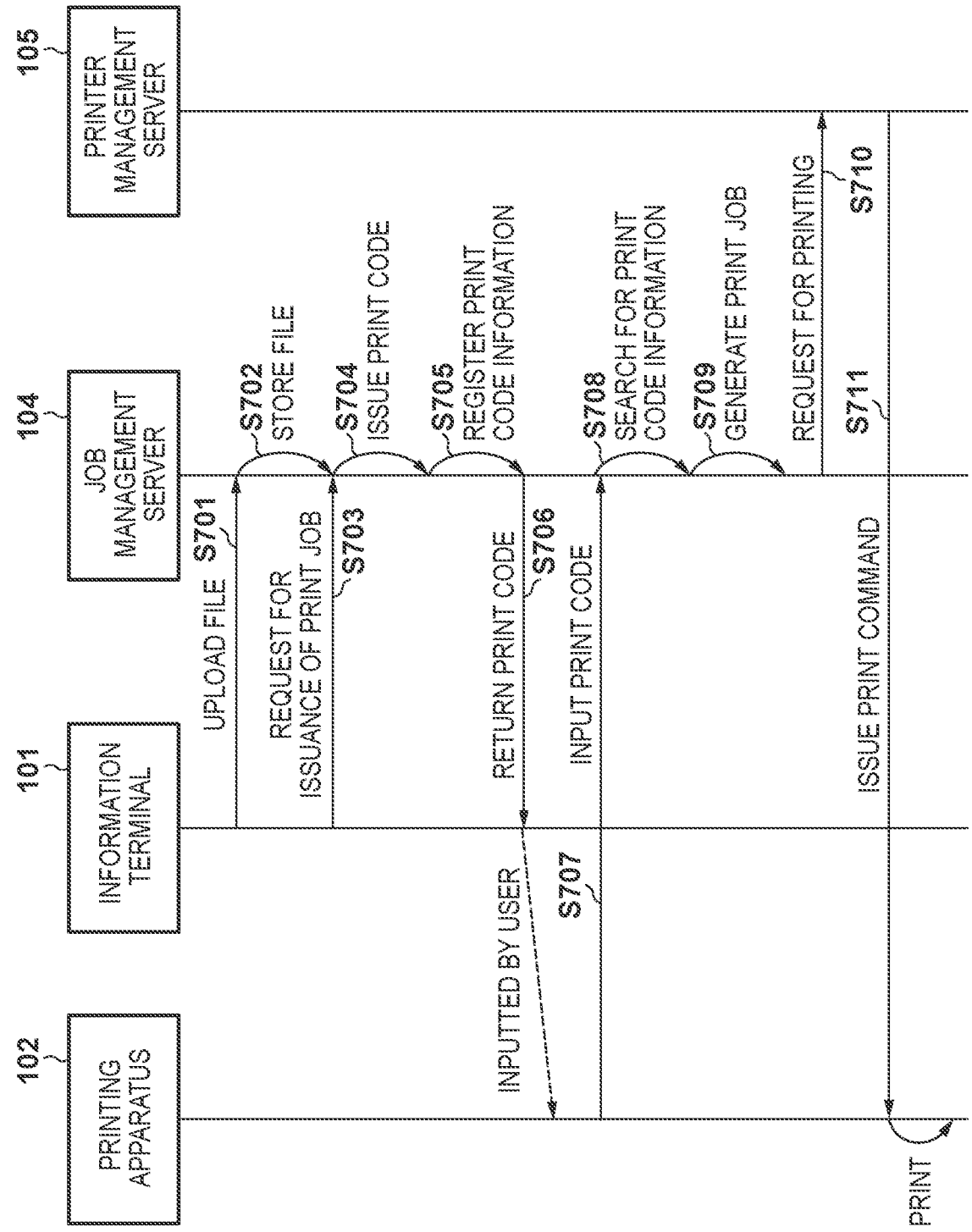
FIG. 7 is a sequence diagram for explaining a flow for when performing hold printing between the printing apparatus, the information terminal, the job management server, and the printer management server according to the embodiment.

FIG. 7 is a sequence diagram for explaining a flow for when performing hold printing between the printing apparatus 102, the information terminal 101, the job management server 104, and the printer management server 105 according to the embodiment.

First, when a file is uploaded from the information terminal 101 to the job management server 104 together with the user ID in step S701, in step S702, the job management server 104 stores the file. Next, in step S703, a request for issuing a print job is made from the Web browser 106 of the information terminal 101 to the job management server 104. By this, in step S704, the job management server 104 issues a print code, and in step S705, the print code information is registered in the job management server 104. Then, in step S706, the print code is returned to the information terminal

101. By this, a screen illustrated in FIG. 9A, for example, is displayed on the display unit of the information terminal 101. Here, the print code information registered in the job management server 104 includes the ID of the user who requested printing, the print code, and the information on the file to be printed.

Next, in step S707, when the user enters the print code into the printing apparatus 102, the print code is notified to the job management server 104 together with the ID of that printing apparatus. By this, in step S708, the job management server 104 searches for a file related to the print code based on the print code information described above. Then, in step S709, the job management server 104 generates a print job based on the file found by that search. At this time, the print code information DB 404 is updated to include the ID of the printing apparatus. Then, in step S710, the job management server 104 transmits a print instruction including the generated print job and the ID of the printing apparatus to the printer management server 105. By this, in step S711, the printer management server 105 issues, based on the print job, a print command to the printing apparatus 102 corresponding to the printing apparatus ID transmitted from the job management server 104.

As described above, the file uploaded by the user from the information terminal 101 can be printed by, for example, a printing apparatus that is in the vicinity and is recognized by the user.

Figure 8:
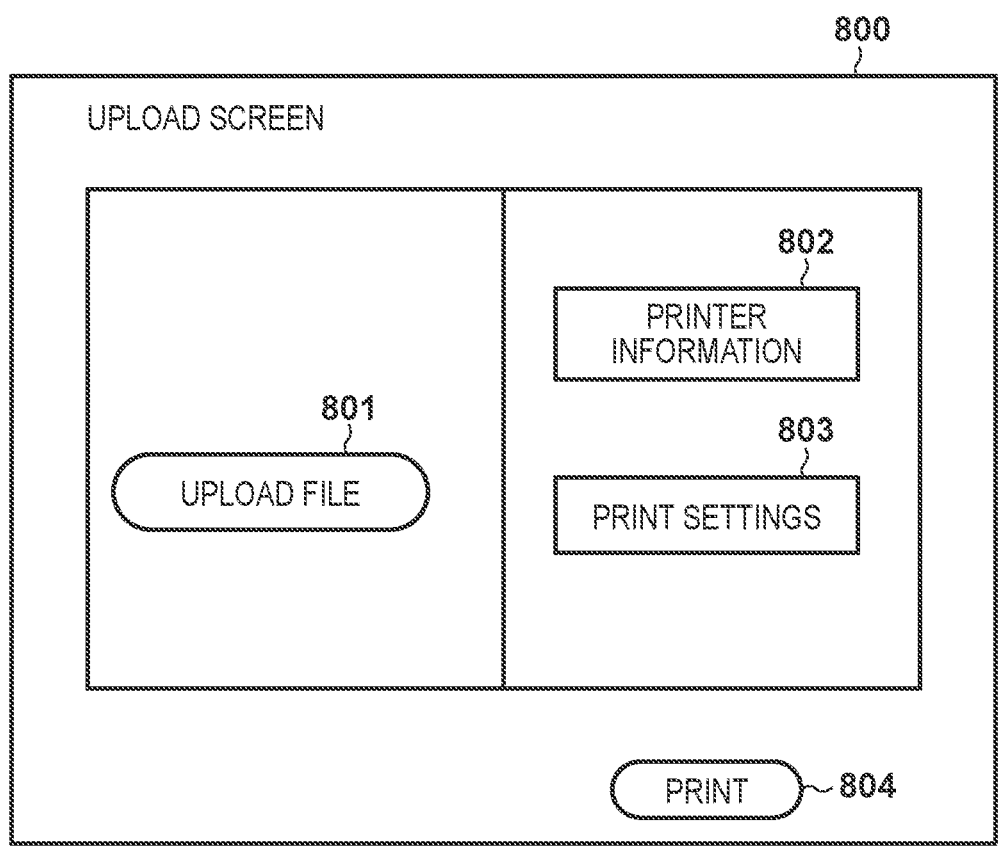
FIG. 8 is a diagram illustrating an example of an upload screen to be displayed on the information terminal when the information terminal uploads a file to a job management server and requests issuance of a print job in the print system according to the embodiment.

FIG. 8 is a diagram illustrating an example of an upload screen to be displayed on the information terminal 101 in order that the information terminal 101 uploads a file to the job management server 104 and requests for a print job to be issued after the information terminal 101 and the printing apparatus 102 have been associated in the print system according to the embodiment. Specifically, an example of a screen to be displayed on the information terminal 101 for uploading of a file, print settings, and making an instruction for generating a print job in the job management server 104 is illustrated.

An upload screen 800 indicates a framework of a GUI. An area 801 is a predetermined area for uploading a file, and a file that a user wants to print can be uploaded by dragging and dropping an icon of the file to this area 801. Printer information 802 is an area for displaying printer information. The ID of the printing apparatus is displayed in the printer information 802. Alternatively, the ID of the printing apparatus need not be displayed but held on the Web browser 106 of the information terminal 101. There may also be a plurality of registered printing apparatuses, and configuration may be taken so as to be able to select a target printing apparatus 102 from the plurality of printing apparatuses. Print settings 803 include the number of copies, paper size, layout, single-sided/double-sided printing setting, print color setting, print range, and the like. The information displayed in the print settings 803 is not limited to the number of copies, paper size, layout, single-sided/double-sided printing setting, print color setting, and print range. The print settings may also be integrated with a function for accepting input in an input box or a selection box. Thus, by the user uploading a file, editing the settings in the print settings 803, and pressing a print button 804, the job management server 104 can issue a print code and register the print code information.

The relationship between FIG. 7 and FIG. 8 will be described.

When the user uploads a file to the area 801, the processing in step S701 of FIG. 7 is executed, and in step S702, the file is stored in the job management server 104. Then, when the user edits the print settings 803 and presses the print button 804, in step S703, a request for issuing a print job is transmitted from the information terminal 101 to the job management server 104. By this, the job management server 104 issues a print code in step S704 and registers print code information in step S705. Then, the print code is returned to the Web browser 106 of the information terminal 101.

Figure 9A:
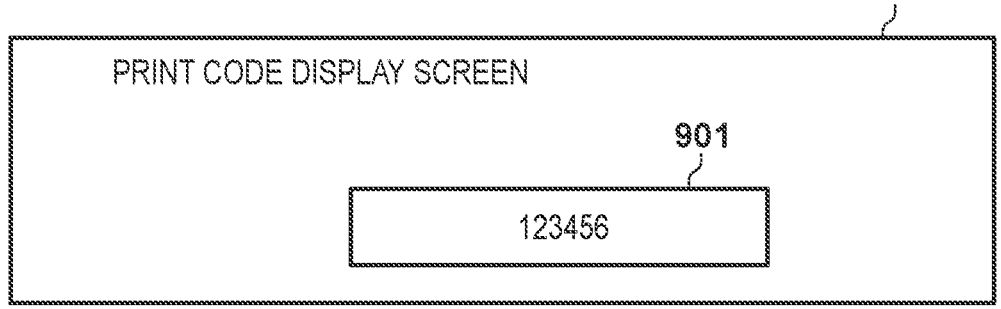
FIG. 9A is a diagram illustrating an example of a print code display screen for displaying the print code to be displayed on the information terminal according to the embodiment.

FIG. 9A is a diagram illustrating an example of a print code display screen for displaying the print code to be displayed on the information terminal 101 according to the embodiment.

This print code display screen is displayed when the job management server 104 returns the print code to the information terminal 101 in step S706. A print code display screen 900 indicates a framework of a GUI of a screen for displaying the print code, and an area 901 is a field for displaying the print code. When the print code is returned from the job management server 104, the Web browser 106 of the information terminal 101 displays the print code display screen 900 and presents the print code to the user.

Figure 9B:
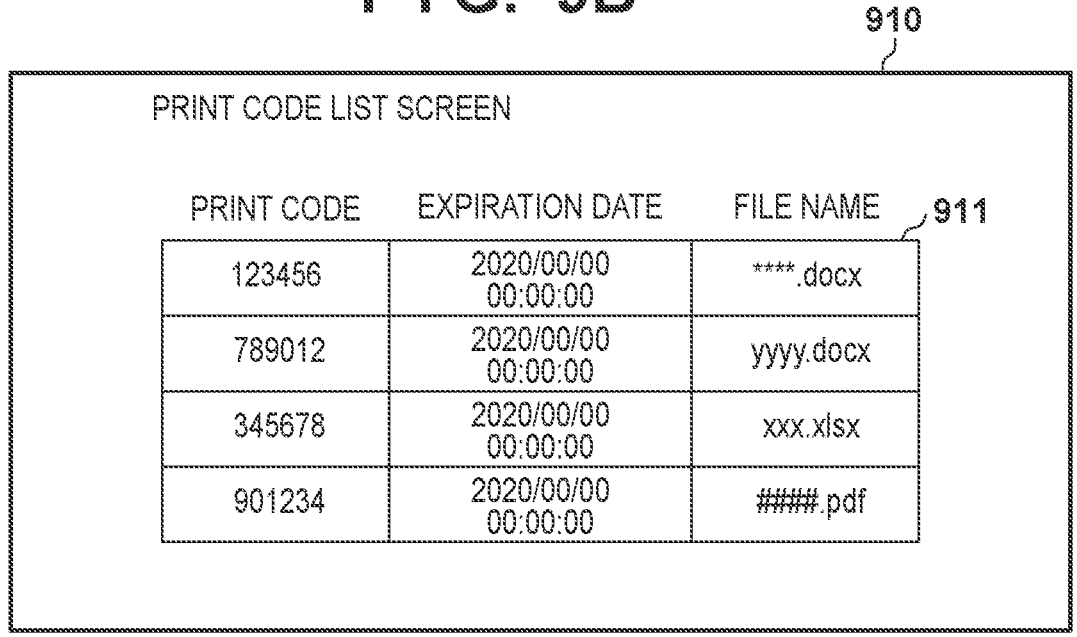
FIG. 9B is a diagram illustrating an example of a print code list screen for displaying a list of print codes registered by a user of the information terminal to be displayed on the information terminal according to the embodiment.

FIG. 9B is a diagram illustrating an example of a print code list screen which is to be displayed on the information terminal 101 by the job management server 104 according to the embodiment responds to the information terminal 101 and in which a list of print codes registered by the user of the information terminal 101 is displayed.

A print code list screen 910 illustrates a framework of a GUI for a screen of a list of issued print codes. A list 911 is a field for displaying a list of issued print codes. Print codes of another user are not displayed in this list of print codes. The user of the information terminal 101 confirms a print code from this print code list screen and inputs, into the printing apparatus 102, the print code corresponding to the file that they want to print. This list 911 displays the print code, the expiration date of the print code, and the file name. The items to be displayed here are not limited to the print code, the expiration date of the print code, and the file name.

Figure 9C:
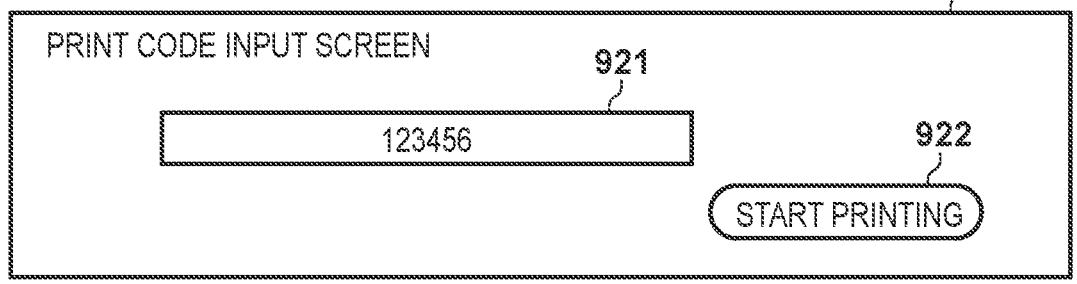
FIG. 9C is a diagram illustrating an example of a print code input screen for inputting the print code displayed on the printing apparatus.

FIG. 9C is a diagram illustrating an example of a print code input screen to be displayed on the printing apparatus 102 when the user inputs a print code on the printing apparatus 102 according to the embodiment (step S707).

A print code input screen 920 indicates a framework of a GUI on the printing apparatus 102. When the user enters the print code in an input field 921 and presses a print start button 922, the inputted print code and the ID 501 of the printing apparatus are transmitted to the job management server 104 (step S707). When the print code and the ID 501 of the printing apparatus are received, the job management server 104 searches for the print code information of the print code management DB 403, which has been described above, based on the ID 501 and the print code. The job management server 104 obtains a corresponding file ("**.docx" in the example of FIG. 9B) based on the print code information obtained by the search and generates a print job. Then, the print job is transmitted to the printer management server 105 and a print request is made (step S710). By this, the printer management server 105 issues, to the printing apparatus 102, a command for executing printing based on the print job (step S711**).

Next, a method for managing of DBs according to the embodiment and specific operation will be described.

FIG. 10 is a flowchart for explaining processing by the job management server 104 according to the embodiment from when it stores an uploaded file and then generates a print code until when it returns the print code to the information terminal 101. The corresponding processing in FIG. 7 is indicated in parentheses in the following description. The processing indicated in this flowchart is achieved by the CPU (corresponding to the reference numeral 201 of FIG. 2) of the job management server 104 executing a program stored in the storage unit (corresponding to the reference numeral 202 of FIG. 2) by deploying it in the memory (corresponding to the reference numeral 204 of FIG. 2).

This processing is started by the user uploading a file using the information terminal 101 (step S701), and in step S1001, the job management server 104 stores the uploaded file. Next, when the user requests for a print job to be issued (step S703), in step S1002, the job management server 104 generates a print code (step S704). Next, the processing proceeds to step S1003, and the job management server 104 stores, in the print code management DB 403, the generated print code, the ID 501 of the printing apparatus, and the storage location of the file (step S705). Next, the processing proceeds to step S1004, and the job management server 104 returns the generated print code to the information terminal 101 (step S706) and then terminates the processing.

Figure 11:
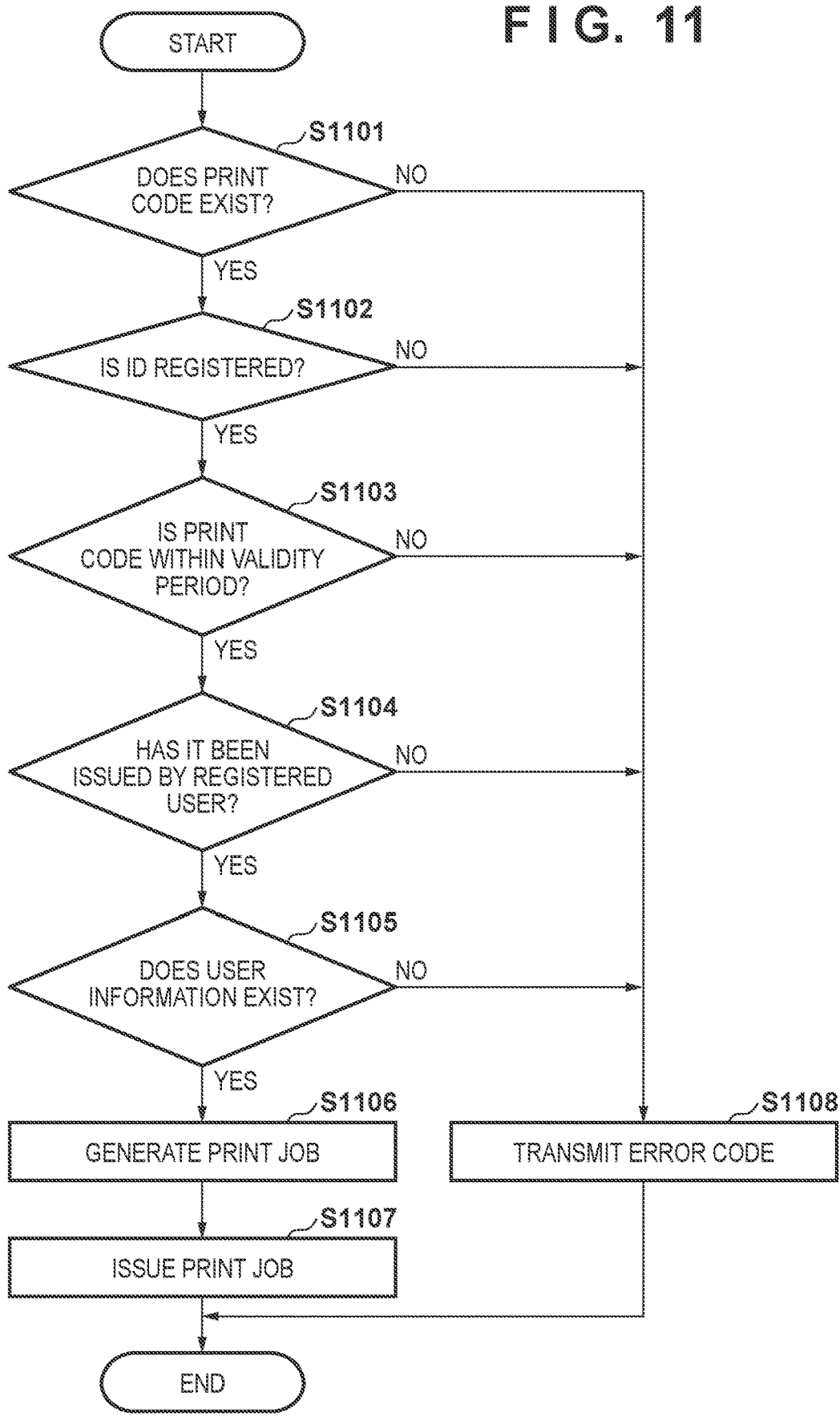
FIG. 11 is a flowchart for explaining processing for when a print code is received from the printing apparatus by the job management server according to the embodiment.

FIG. 11 is a flowchart for explaining processing for when a print code is received from the printing apparatus 102 by the job management server 104 according to the embodiment (step S707). The processing indicated in this flowchart is achieved by the CPU (corresponding to the reference numeral 201 of FIG. 2) of the job management server 104 executing a program stored in the storage unit (corresponding to the reference numeral 202 of FIG. 2) by deploying it in the memory (corresponding to the reference numeral 204 of FIG. 2).

This processing is started by the user inputting the print code from the printing apparatus 102, and in step S1101, the job management server 104 determines whether or not the print code is registered in the print code management DB 404 by searching the print code management DB 404 based on the inputted code value. If it is determined that the inputted print code does not exist in the print code management DB 404, the processing proceeds to step S1108, an error code is transmitted to the printing apparatus 102, and then this processing is terminated.

Meanwhile, in a case that it is determined that the print code exists, the processing proceeds to step S1102, and the job management server 104 determines whether or not the ID 501 of the printing apparatus transmitted from the printing apparatus 102 is registered in the print code management DB 404. In a case that the ID of the printing apparatus 102 is not registered here, the processing proceeds to step S1108, an error code is transmitted to the printing apparatus 102, and then this processing is terminated.

In a case that it is determined in step S1102 that the ID of the printing apparatus is registered, the processing proceeds to step S1103, and the job management server 104 determines whether or not the inputted print code is before its expiration date. In a case that it is not before its expiration date, the processing proceeds to step S1108, an error code is transmitted to the printing apparatus 102, and then this processing is terminated.

If it is determined that the print code inputted in step S1103 is before its expiration date, the processing proceeds to step S1104, and the job management server 104 determines whether or not the print code information has been issued from a user registered in the user information DB 402. If it is determined that the print code has been issued by the user registered in the user information DB 402, the processing proceeds to step S1105, and if not, the processing proceeds to step S1108, an error code is transmitted to the printing apparatus 102, and then this processing is terminated. In step S1105, the job management server 104 determines whether or not the information on the user has been deleted from the job management server 104 and, if it has been deleted, the processing proceeds to step S1108, transmits an error code to the printing apparatus 102, and then terminates this processing.

In a case that it is determined in step S1105 that the information on the user has not been deleted from the job management server 104, the processing proceeds to step S1106. In step S1106, the job management server 104 generates a print job from the stored print code, the print code information DB 404, and the file information DB 1203. Next, the processing proceeds to step S1107, and the job management server 104 issues a request for printing the print job to the printer management server 105, and then terminates this processing.

In step S1108, an error status code that varies depending on the cause of an error is generated and then transmitted to the printing apparatus 102. The printing apparatus 102 then displays an error message based on the error status code.

FIG. 12A is a functional block diagram for describing functional configurations of the job management server 104 and the printer management server 105 according to the embodiment.

The job management server 104 receives data and transmits data to a target server through the Web 103. The printer management server 105 also has a transmission and reception function. The job management server 104 includes the print code information DB 404 including print job information and the user information DB 402 for storing the user ID and authentication information 401. Further, a file information DB 1203 for storing a storage position of an uploaded file, and the printer information DB 403 for storing information on the printing apparatus 102 associated with the user are included.

The printer management server 105 includes a printer information DB 1210 for storing information unique to the printing apparatus, and a registration code information DB 1211 including the information of the printer information DB and the registration code.

FIG. 12B is a diagram illustrating an example of the print code information DB 404 stored in the job management server 104 according to the embodiment.

In this print code information DB 404, a print code is managed with an expiration date for each ID of the printing apparatus. The print code information DB 404 stores the ID of the printing apparatus, print code, user ID, expiration date, and print job information of the printing apparatus. This print code will become unavailable after the expiration date. Therefore, even if an expired print code is entered in the printing apparatus 102, confirmation is performed in step S1103 of FIG. 11 and printing cannot be performed.

In the example of FIG. 12B, a single user (U00001) registers a print code for each of the plurality of printing apparatuses. Here, a print code is uniquely determined and registered for an ID of each printing apparatus.

As described above, by virtue of the embodiment, a print job is generated in association with an ID of a printing apparatus, user information, and a print code. As a result, when a user inputs a print code in the printing apparatus, the user ID, the print code, and the ID of the printing apparatus are transmitted to the job management server 104 from the printing apparatus. The job management server 104 searches for a target print job based on the print code information, and when the target print job is found, a print command for the print job is issued to the printing apparatus. This allows the user to perform the hold printing simply by entering the print code, without requiring complicated authentication work, a separate authentication device, or the like. This can prevent erroneous printing even in, for example, a business model in which a printing apparatus is rented to a user.

In the above-described embodiment, description has been given using an example in which the job management server 104 and the printer management server 105 are provided; however, as described above, one server may have the functions of these two servers. Further, the job management server 104 is not limited to an example in which it implemented by one server device (information processing apparatus) and may be implemented by a plurality of server devices. In other words, the job management server 104 may be implemented by a server system comprising one or more servers. Similarly, the printer management server 105 may be implemented by a server system comprising one or more server devices.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-109416, filed Jun. 30, 2021, which is hereby incorporated by reference herein in its entirety.

What is claimed is:

1. A print system including an information processing apparatus, at least one printing apparatus, and a server system, the information processing apparatus comprising:
a first display;
one or more first memories storing instructions; and
one or more first processors that execute the instructions stored in the one or more first memories to:
upload a file to the server system together with identification information of a printing apparatus to be used for printing the file;
display, on the first display, a print code for printing the file received from the server system; and
the server system comprising:
one or more second memories storing instructions; and
one or more second processors that execute the instructions stored in the one or more second memories to:
store, in a storage unit, the file that has been uploaded from the information processing apparatus;
generate the print code based on a request for issuing a print job of the file from the information processing apparatus and transmit the generated print code to the information processing apparatus;
store, in a memory, the generated print code in association with information of the file and the identification information of the printing apparatus to be used for printing the file;
receive the print code and the identification information of the printing apparatus that have been transmitted from the printing apparatus;
search for the stored file that is associated with the received print code and the identification information and generate the print job based on the searched file; and
transmit the print job to the printing apparatus corresponding to the received identification information to cause the printing apparatus to print the file, and the printing apparatus comprising:
a second display;
one or more third memories storing instructions; and
one or more third processors that execute the instructions stored in the one or more third memories to:
display, on the second display, a screen that accepts input of the print code from a user of the information processing apparatus;
transmit, to the server system, the inputted print code and the identification information of the printing apparatus; and
execute printing of the file based on the received print job.

2. The print system according to claim 1, wherein the one or more second processors are configured to:
in the generation of the print job,
determine whether the received print code is registered,
in a case where the received print code and the identification information of the printing apparatus are registered, generate the print job based on the searched file, and
in a case where the received print code and the identification information of the printing apparatus are not registered, not generate a print job.

3. The print system according to claim 1, wherein the one or more second processors are further configured to:
receive identification information of a printing apparatus from the printing apparatus;
transmit a registration code of the printing apparatus to the printing apparatus; and
receive the registration code that has been transmitted from the information processing apparatus, and register the identification information of the printing apparatus that is associated with the received registration code, and
wherein the one or more third processors are configured to:

when receiving the registration code from the server system, cause the second display to display the received registration code.

4. The print system according to claim 3, wherein the information processing apparatus transmits the registration code that has been inputted via the first display of the information processing apparatus based on the registration code that has been displayed on the second display of the printing apparatus to the server system.

5. The print system according to claim 1, wherein the file is uploaded to the server system by the user of the information processing apparatus dragging and dropping an icon of the file to a predetermined area of a screen of the first display.

6. The print system according to claim 1, wherein the generated print code is stored with an expiration date, and
wherein the one or more second processors are configured to:
in the generation of the print job, not generate a print job of a file that corresponds to a print code whose expiration date has passed.

7. The print system according to claim 1, wherein the one or more second processors are further configured to:
store user authentication information and the print code in association.

8. The print system according to claim 1, wherein the one or more second processors are further configured to:
in the generation of the print job, in a case where the identification information of the printing apparatus that is associated with the print code that has been transmitted from the printing apparatus is registered, generate the print job.

9. The print system according to claim 1, wherein the one or more first processors are further configured to:
display, on the first display, a list of print codes received from the server system to cause the user to select the print code, and
wherein the one or more third processors are configured to:
display, on the second display, the screen that accepts input of the print code selected by the user.

10. A server system that is capable of communicating with a printing apparatus, the system comprising:
one or more memories storing instructions; and
one or more processors that execute the instructions in the memories to:
store, in a storage unit, a file that has been uploaded from an information processing apparatus being capable of communicating with the server system;
generate a print code based on a request for issuing a print job of the file from the information processing apparatus and transmit the generated print code to the information processing apparatus;
store, in a memory, the generated print code in association with information of the file and identification information of a printing apparatus to be used for printing the file;
receive the print code and the identification information of the printing apparatus that have been transmitted from the printing apparatus;
search for the stored file that is associated with the received print code and the identification information and generate the print job based on the searched file that is associated with the received print code; and
transmit the print job to the printing apparatus corresponding to the received identification information to cause the printing apparatus to print the file.

11. The server system according to claim 10, wherein the generated print code is stored with an expiration date, and
wherein the one or more processors are configured to:
in the generation of the print job, not generate a print job of a file that corresponds to a print code whose expiration date has passed.

12. The server system according to claim 10, wherein the one or more processors are further configured to:
store user authentication information and the print code in association.

13. The server system according to claim 10, wherein the one or more processors are further configured to:
in the generation of the print job, in a case where identification information of a printing apparatus that is associated with the print code that has been transmitted from the printing apparatus is registered, generate the print job.

14. The server system according to claim 10, wherein the one or more processors are further configured to:
receive identification information of a printing apparatus from the printing apparatus,
transmit a registration code of the printing apparatus to the printing apparatus, and
receive the registration code that has been transmitted from the information processing apparatus, and register the identification information of the printing apparatus that is associated with the received registration code.

* * * * *